United States Patent
Morovic et al.

(10) Patent No.: US 11,126,900 B2
(45) Date of Patent: Sep. 21, 2021

(54) PROCESSING OF SPOT COLORS IN A PRINTING SYSTEM

(71) Applicant: HEWLETT-PACKARD DEVELOPMENT COMPANY, L.P., Spring, TX (US)

(72) Inventors: Jan Morovic, London (GB); Peter Morovic, Sant Cugat del Valles (ES)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 16/975,616

(22) PCT Filed: Mar. 8, 2018

(86) PCT No.: PCT/US2018/021620
§ 371 (c)(1),
(2) Date: Aug. 25, 2020

(87) PCT Pub. No.: WO2019/172918
PCT Pub. Date: Sep. 12, 2019

(65) Prior Publication Data
US 2020/0410310 A1    Dec. 31, 2020

(51) Int. Cl.
*G06K 15/02* (2006.01)
*G06K 15/10* (2006.01)
*G06F 3/12* (2006.01)

(52) U.S. Cl.
CPC ....... *G06K 15/1878* (2013.01); *G06K 15/102* (2013.01); *G06K 15/1881* (2013.01); *G06F 3/1208* (2013.01)

(58) Field of Classification Search
CPC ............. G06K 15/1878; G06K 15/102; G06K 15/1881; G06F 3/1208
See application file for complete search history.

(56) References Cited

U.S. PATENT DOCUMENTS

| 6,867,884 B1 | 3/2005 | Rozzi |
| 7,706,604 B2 | 4/2010 | Berns |
| 7,710,597 B2 | 5/2010 | Edge |
| 2003/0117457 A1 | 6/2003 | Qiao |
| 2008/0111997 A1* | 5/2008 | Edge .................... H04N 1/6016 358/1.9 |
| 2017/0126931 A1* | 5/2017 | Morovic .............. H04N 1/6016 |

FOREIGN PATENT DOCUMENTS

| EP | 0665678 | 8/1995 |
| EP | 0665681 | 8/1995 |
| JP | 2017003375 | 1/2017 |

* cited by examiner

*Primary Examiner* — Quang N Vo
(74) *Attorney, Agent, or Firm* — HP Inc. Patent Department (57) ABSTRACT

Certain examples relate to the processing of spot colors within a printing pipeline. In these example, a palette of spot colors indicated in a print job is determined. The palette is mapped to a set of vectors in a colorant-dependent color space based on a comparison of target spectral characteristics for the spot colors and measured spectral characteristics of the printing system. The set of vectors is used to assign vectors to print-resolution areas of the print job before halftoning.

15 Claims, 6 Drawing Sheets

PROCESSING OF SPOT COLORS IN A PRINTING SYSTEM

BACKGROUND

In printing systems there is an ongoing challenge to generate a printed output where printed colors match defined source colors. For example, there is a challenge of objectively and consistently rendering a color output, given the sensory apparatus of human beings and the physical limitations of rendering devices. One way to define a color is by way of its spectral response, i.e. by measuring light intensity values across a range of wavelengths that are reflected and/or emitted, and that are known to be detectable by the human eye and brain. For example, a range of between approximately 400 nm and 700 nm is typically taken as a visible range of electromagnetic radiation wavelengths for human beings. Sampling at intervals of 1nm, a color may be defined by an array of 300 entries, where each entry corresponds to an intensity measurement at a particular wavelength. However, spectral representations of color result in high-dimensionality data values. These representations are difficult to accommodate within printing pipelines. For example, a spectral representation of pixels in a high-resolution image of 8.3 megapixels would occupy around 10 GB in memory, assuming each sample is represented as a 32-bit floating-point value. This is beyond the current system and memory bandwidths of modern printing systems. For this reason, reduced dimensionality approximations are commonly used, such as tristimulus values according to a CIE—Commission Internationale de l'Eclairage—standard (e.g. in CIE XYZ color space).

BRIEF DESCRIPTION OF THE DRAWINGS

Various features of the present disclosure will be apparent from the detailed description which follows, taken in conjunction with the accompanying drawings, which together illustrate, features of certain examples, and wherein.

DETAILED DESCRIPTION

Certain examples described herein address a challenge of color matching within a printing system. These examples may be used to help produce printed outputs that provide an improved color match to defined colors, while reducing issues associated with high-dimensionality data that are experienced with full spectral printing pipelines.

Certain examples described herein make use of spot colors that are defined in relation to a print job. For example, in textile printing, a printed output may have 2-8 colors that are desired to match a prototype of the output. The prototype may be a physical or digital prototype. Elements of the prototype, such as printed or displayed patterns, may be designed to have a color that matches a particular spot color. Spot colors have a defined spectral response, e.g. a well-defined appearance, and may be assigned a particular name or code reference. For example, numerous standardized spot color classifications exist, where manufacturers provide a correspondence between set of names or codes and particular inks or pigments.

Certain examples described herein make use of a spot color profile that maps spot color definitions to values in a colorant-dependent color space. These values may be in the form of colorant vectors or area coverage vectors. Area coverage vectors include Neugebauer Primary area coverage (NPac) vectors. The spot color profile represents color mapping data that may be derived from spectrally matched color representations. By providing a spot color profile for use by a printing system, spot colors that are defined within a print job may be mapped to spectrally-matched vectors in a colorant-dependent color space without adaptations to process high-dimensionality spectral data. This allows existing printing systems to be retrofitted to approximate a spectral printing pipeline, i.e. provide spectrally matched printed output within printing systems with limited system resources that may not be able to handle spectral data.

Figure 1:
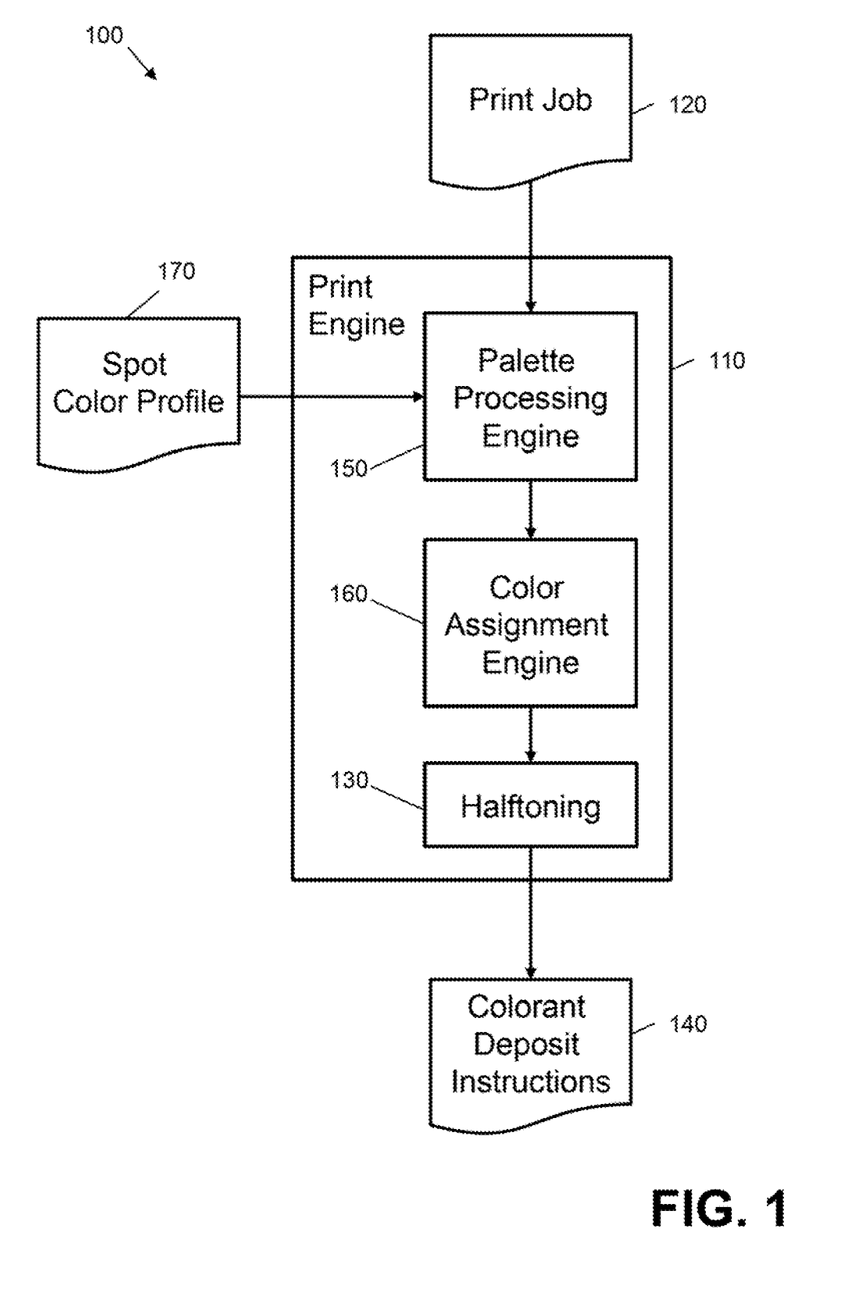
FIG. 1 is a schematic illustration of a printing system according to an example.

FIG. 1 shows a printing system 100 according to an example. The printing system comprises a print engine 110 to receive a print job 120 and to apply a halftoning operation 130 to generate colorant deposit instructions 140 for the printing system. The print engine 110 may be any combination of hardware and programming to implement the functionalities described herein. These combinations of hardware and programming may be implemented in a number of different ways. In certain implementations, the programming for the print engine 110, and its component parts, may be in the form of processor executable instructions stored on at least one non-transitory machine-readable storage medium and the hardware for the engines may include at least one processing resource to execute those instructions. The processing resource may form part of a printing device within the printing system, or a computing device that is communicatively coupled to the printing device. In some implementations, the hardware may include electronic circuitry to at least partially implement the print engine 110. For example, the print engine 110 may comprise an application-specific integrated circuit that forms part of a printing device within the printing system.

The print job 120 comprises data that indicates an image to be printed with a printing device. The printing device may form part of the printing system, or may be independent from the printing system. The printing device may comprise a two- or three-dimensional printer. The print job 120 may comprise image data representing an image to be printed. The image data may be in the form of pixels that have associated color data. The image data may be generated by a design or front-end application that is executed by a computing device. The print job 120 may be generated when a user sends an image to be printed. The print job 120 may also comprise data that indicates how the image is to be printed, e.g. an identification of a printing device, a media substrate, a number of copies to be printed, a size of printed output, etc.

The colorant deposit instructions 140 comprise instructions that may be communicated to a printing device to print an image indicated by the print job 120. A printing device may comprise a set of colorants that are available to the printing system to generate a printed output. For example, Cyan, Magenta, Yellow and Black (CMYK) are common colorants. The colorant deposit instructions 140 may comprise instructions for a set of print-resolution areas (e.g. print-resolution pixels). The print-resolution areas may be defined based on a dots per inch (DPI) output resolution of the printing device. The number of print-resolution areas may differ from the number of input-resolution areas (e.g. a print-resolution may be higher than an input pixel resolution). A printing device may be capable of rendering a dot or deposit of colorant every 10-50 micrometres. A printing device may be capable of rendering one or a plurality of dots or deposits of colorant at each addressable area. In an inkjet printing device, the colorant deposit instructions 140 may comprise printing fluid ejection instructions for one or more printheads. The colorant deposit instructions 140 may indicate a number of discrete deposit amounts for each colorant. For example, in a CMYK printing device with two drop states (i.e. drop or no-drop), the colorant deposit instructions 140 may comprise four binary values for each addressable area. In an inkjet printing system, the colorant deposit instructions 140 may be converted into electrical signals to activate piezo-electric or thermal inkjet nozzles in a print head arranged to deposit a particular colorant.

Returning to FIG. 1, the print engine 110 comprises a palette processing engine 150 and a color assignment engine 160. As described for the print engine 110, the palette processing engine 150 and the color assignment engine 160 may comprise a combination of hardware and programming to implement the functionality described herein. As shown in FIG. 1, in use, the print engine 110 accesses a spot color profile 170. The spot color profile 170 comprises data that indicates a correspondence between spot color definitions and vectors in a colorant-dependent color space. Spot color definitions may take several forms. In one case, a spot color may be indicated by a reference to a predefined color, e.g. by reference to a standardized string label that is assigned to a reflectance spectrum. The spot color may be said to be a "named" spot color, as a predefined string is associated with a predefined reflectance spectrum. For example, a printing fluid manufacturer may produce an ink that has a defined reflectance spectrum under standardized conditions, e.g. standardized illumination conditions. The printing fluid manufacturer may provide data, e.g. in the form of a downloadable color profile, that represents this reflectance spectrum, e.g. in the form of an array of n data values, where n may be between 30-300. The ink, and the reflectance spectrum, may have an associated name, such as "cornflower blue" or "C1234". There are a number of entities that provide lists of up to 1000 named spot colors. A user of a graphics editing application may define an area in an image and indicate that a particular spot color is to be associated with the area. For example, the graphics editing application may have a palette of available colors that include one or more spot colors.

To provide an accurate color match, comparative printing systems may use a particular printing fluid to print a spot color. Using the example above, a printing system may be equipped with the "cornflower blue" ink, wherein indications in a print job that pixels are to be printed with the "cornflower blue" are translated by a comparative print engine into instructions to deposit that particular ink. However, printing systems that use bespoke inks are typically unsuitable for high-volume print runs or images with a range of different colors. For this reason, many printing systems use offset printing, where a fixed set of colorants (such as Cyan, Magenta, Yellow and Black) are used. In offset printing, dots or deposits of these colorants are layered over each other to create different colors. Colors produced in this manner are typically referred to as "process colors".

In the present examples, spot colors are mapped to colorant-dependent color vectors that are halftoned to generate deposit instructions for a set of available colorants. Hence, these examples effectively convert a spot color "into a process color". This mapping is based on a comparison of target spectral characteristics for a plurality of spot colors and measured spectral characteristics of the printing system, i.e. on spectral matching. In the example of FIG. 1, the mapping is encapsulated in the spot color profile 170. The spot color profile 170 is generated based on the characteristics of the particular printing system being used, e.g. either on a model or machine basis. In one case, the spot color profile 170 is generated by a particular printing system; in another case, the spot color profile 170 is generated by a reference printing system and communicated to the particular printing system, the two printing systems being of the same or a similar type. For example, in the latter case, for a given model of printing device, a manufacturer of the printing device may generate the spot color profile 170 under reference or controlled "factory" conditions, and then make the spot color profile 170 accessible to users of individual printing devices.

The comparison of target spectral characteristics may be based on a printed output of the printing system. For example, test patches may be printed by the printing system and a spectral response of these test patches may be measured. The test patches may feature certain test colors than are usable to model the spectral characteristics of the printing system. In one case, a spectral gamut may be computed representing the range of reflectance spectra that are printable by the printing device. In this case, the comparison may comprise selecting a point within the spectral gamut that best matches a target spectrum for a given spot color, i.e. that minimizes a distance or error function. The distance or error function may be based on a color difference and/or predefined color metric.

Returning to FIG. 1, the palette processing engine 150 is configured to identify a palette of spot colors for the print job 120 and to determine a set of vectors in the colorant-dependent color space that match the palette of spot colors based on the spot color profile 170. For example, this may comprise parsing data for the print job (e.g. metadata for an image to be printed) and extracting names, codes or references for the set of spot colors used within the image. In certain cases, an input image for a print job may only feature spot colors, in which case the palette processing engine 150 determines all colors that are used in the input image. In certain cases, an input image may not have conventional Red, Green, Blue (RGB) pixel values but may comprise a separation (i.e. separate image) for each spot color. An equivalent implementation may also feature color channels for each used spot color, wherein a color channel comprises a value for each pixel for a particular spot color. In one case, a spot color channel may be binary, e.g. indicate whether a spot color is used or not for a given pixel. In one case, the palette processing engine 150 generates a list of named spot colors that are used in the print job (e.g. [C1234, C0445, C0998]). This list is then mapped to an equivalent set of colorant-dependent vectors using the spot color profile 170, which may be in the form of a look-up table. An output of the palette processing engine 150 may comprise an array of (spot color, colorant-dependent vector) pairs or tuples.

In FIG. 1, the color assignment engine 160 uses the output of the palette processing engine 150 to parse the print job 120 and assign vectors from the set of vectors to print-resolution areas based on defined spot colors for the print-resolution areas. For example, given a list of spot color—vector pairs, the color assignment engine 160 may generate one or more images where the spot colors used in an input image are replaced by their mapped colorant-dependent vector equivalent. The output of the color assignment engine 160 may comprise a rasterized print-resolution image where each print-resolution pixel is assigned a colorant-dependent vector (e.g. an array with values representative of different colorant-dependent components). The output of the color assignment engine 160 is passed to the halftoning component 130 of the print engine 110. The halftoning component 130 is configured to apply halftoning to colorant-dependent vectors to generate colorant deposit instructions 140. Halftoning at least spatially distributes proportions of colorant states that are defined by the colorant-dependent vector across print-resolution areas. Halftoning may apply known halftoning functions, such as those based on threshold matrices, error diffusion and/or parallel random weighted area coverage selection (PARAWACS). The colorant deposit instructions 140 indicate where colorants that are available to the printing system are to be deposited, e.g. with reference to output print areas at a print resolution.

In one case, the print engine 110 comprises a print job interface to receive the print job 120. The print job 120 may be received over a physical coupling (e.g. a Universal Serial Bus) or a network connection. The print job 120 may comprise image data comprising a plurality of pixels and color data indicating named spot colors assigned to each of the plurality of pixels. In certain cases, the print engine 110 maps between the named spot colors and vectors from the set of vectors without processing spectral data. For example, the print engine 110 may comprise a legacy printing device and/or a Halftone Area Neugebauer Separation (HANS) pipeline where it is not possible and/or practical to process spectral data. For example, these devices may only use colorant-dependent vectors. The use of the spot color profile 170 allows named spot colors to be directly mapped to colorant-dependent vectors without processing spectral representations within the print engine 110.

The printing system 100 of FIG. 1 enables spectrally-defined spot colors to be mapped directly to the colorant-dependent color space of the printing system. This enables more accurate and efficient workflow and printing pipeline implementations.

In one implementation, the colorant-dependent vector may indicate proportions of available colorants, e.g. for a CMYK system indicate a percentage for each colorant where the vector components sum to unity. In another implementation, the colorant-dependent vector may comprise area coverage vectors, each element in an area coverage vector representing a proportional area coverage of one of a set of colorant deposit states for the plurality of available colorants, the set of colorant deposit states representing available print states of the printing system. In this implementation, the vector components may also sum to unity. The set of colorant deposit states may relate to Neugebauer Primaries (NPs). Each colorant may have two or more deposit states, representing quantities of colorant that are to be deposited. For example, in a binary printing device that can deposit or not deposit a particular colorant, each colorant may have two colorant deposit states: 0 and 1.

In a printing system that can deposit m drops of colorant there may be m+1 deposit states, e.g. no drops, one drop, two drops etc. The set of colorant deposit states for the printing system may therefore represent all combinations of these deposit states for the set of available colorants, where these combinations include overprints. For example, a binary (2-state) printing system having 3 colorants (say CMY) has 8 ($2^3$) colorant deposit states: [W—white or blank, C, M, Y, CM, CY, MY, CMY], where the general relationship is given by the number of states raised to the power of the number of colorants. In an implementation that uses area coverage vectors, these vectors may comprise Neugebauer Primary Area Coverage (NPac) vectors, where each component relates to an area coverage value for an NP. In an NPac vector the component values also sum to unity (i.e. 1). An NP in this case represents a composition of an output print-resolution area following halftoning, e.g. blank, having one colorant, having several colorant, having several quantities of colorants, and the like. An area coverage value, i.e. a component value in an NPac vector, may alternatively be seen as a probability of depositing an Neugebauer Primary associated with the value, e.g. for a given print area 0.6 CM represents a 60% probability of depositing a drop of Cyan and a drop of Magenta (e.g. Magenta printed over Cyan) for the print area. An NPac vector may comprise a full set of available NPs or a selected subset, e.g. [W, C, Y, CM]. Halftoning an NPac vector may comprise applying PARAWACS or error diffusion, wherein NPs are sampled for a print-resolution area based on their probabilities as defined by the area coverage values. Spatial distribution during halftoning may be defined using predetermined matrices of random numbers that are used to sample the NPs, e.g. a selector matrix may have a resolution equal to the print resolution and each selector matrix value may be a number that is used to sample the NP from the NPac for a corresponding print-resolution area. NPac implementations differ from comparative halftoning pipelines as the NPac vector controls the overprint properties leaving only spatial distribution to be determined by the halftoning process; whereas comparative halftoning pipelines determine both spatial and overprinting properties.

Figure 2:
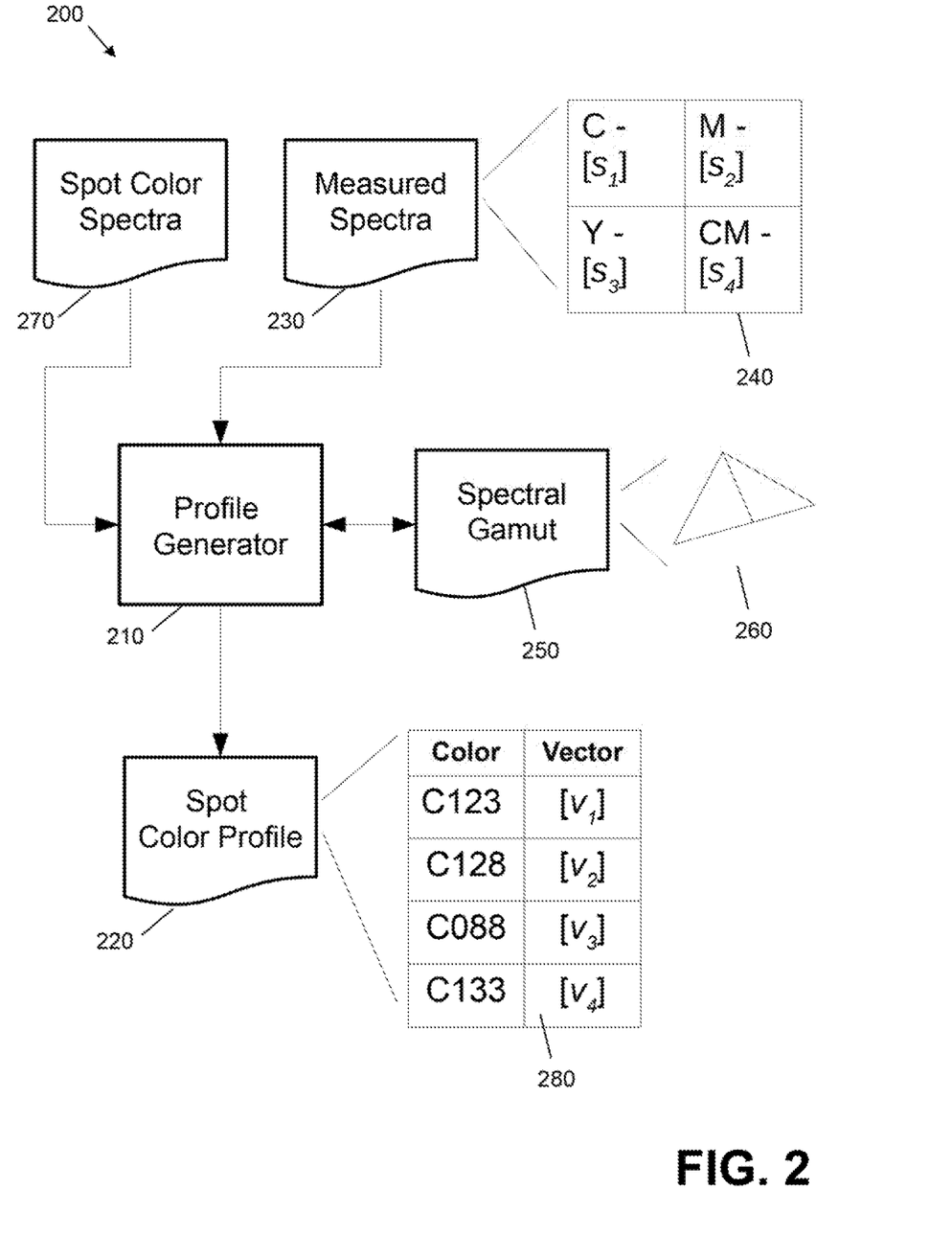
FIG. 2 is a schematic illustration of a profile generator according to an example.

FIG. 2 shows an example 200 of a profile generator 210 that may be used to generate a spot color profile 220. The spot color profile 220 may comprise the spot color profile 170 of FIG. 1. The profile generator 210 may form part of the printing system 100 or may be separate from the printing system 100. For example, the profile generator 210 may form part of a separate device and be used to generate a spot color profile 220 that is downloadable or otherwise communicable to a particular printing system such as printing system 100.

The profile generator 210 of FIG. 2 is arranged to instruct printing of test patches for selected vectors in colorant-dependent color space and to receive data 230 indicative of measured spectra for the test patches. For example, the test patches may comprise colorants at various proportions or NPs at various different area coverage values (e.g C at 10%, 20% . . . with W at 90%, 80% etc., repeated for a set or subset of available NPs). These various proportions may form "ramps" of color. Any suitable device for measuring spectral characteristics may be used, for example a spectrometer or spectrophotometer, which may or may not be built-in with the printing system. Reflectance intensities of test patch, e.g. under a defined illuminant such as D50, may be scanned between a predetermined range of wavelengths in a chosen number of steps. For example, a built-in spectrophotometer may be able to measure visible wavelengths, for example in the range 400 nm to 700 nm. Spectral characteristics may be obtained from a spectrum of a measured color. Measurements may be integrated across intervals of width D, such that the number of intervals, N, equals the spectral range divided by D. In one example, the spectral range may be 400 nm to 700 nm and D may be 10 nm, resulting in values for 32 intervals, i.e. N=32. D may be set based on the properties of a specific spectrophotometer and/or configured based on the specific characteristics of each example. Each value may be a value of reflectance, e.g. measured intensity, for each test patch. Each test patch may be printed with a defined area. Measurements may in certain cases be post-processed, e.g. normalized, cleaned and/or filtered, as appropriate.

The profile generator 210 in FIG. 2 is configured to compute a spectral gamut 250 based on the received data 230. A spectral gamut is a volume within spectral space, i.e. a volume within the number of dimensions defining the spectral response—in the example above this was thirty-two. A three-dimensional volume 260 is shown in FIG. 2 to be illustrative of this volume as it is not possible to visualize spectral spaces with more than three dimensions; however, the actual volume may be within, e.g., thirty to three-hundred-dimension space. The spectral gamut 250 for a particular model of printing device represents reflectance spectra that it is possible to reproduce using the printing device. The spectral gamut 250 may be much smaller than the total possible range of reflectance spectra within the space (i.e. than the total volume of the space). A spectral gamut 250 may be generated using a model of a printing device operated under factory conditions and used for implementations of the model that are produced by a manufacturer.

The spectral gamut 250 is usable to map between a colorant-dependent color space and a spectral color space. This mapping may be used to generate the spot color profile 220. In FIG. 2, the profile generator 210 also receives spot color spectra 270. The profile generator 210 attempts to locate points in the spectral gamut 250 that best match the spot color spectra, i.e. that minimize a distance or error function within spectral space. In this way the profile generator 210 constructs the spot color profile 270 based on a comparison of target spectral characteristics for the palette of spot colors and measured spectral characteristics of the printing system. The spot color spectra 270 may be provided by one or more organizations that provide a standardized list of spot colors. Spectra may be provided for a plurality of spot colors. The term "spectra" used here also includes sampled and processed spectra. The distance or error function may comprise a function of one or more of: a root-mean squared error in spectral space and a $\Delta E$ color difference (delta E—e.g. $\Delta E_{76}$, $\Delta E_{94}$, or $\Delta E_{00}$). The $\Delta E$ color difference may be evaluated for a plurality of specific illuminants. The illuminants may be selected based on the implementation. e.g. for textile printing illuminants, such as D65, A and U35 may be selected. A statistical aggregate, such as an average or median, of multiple difference metrics may be computed and used in the distance or error function.

Located points in spectral space may then be converted into colorant-dependent vectors for the spot color profile 220. This may include determining a polyhedron within the spectral gamut 250 that encloses a located point, wherein vertices of the polyhedron represent a set of vector elements, such as NPs printable by the printing system. The location of a point as a function of the locations of the vertices of the polyhedron may then be determined to compute colorant-dependent vectors, such as area coverage values for a set of NPs to form an NPac vector.

FIG. 2 shows an example spot color profile 220 in the form of a look-up table 280. The look-up table has two columns: a first column containing spot color names or references and a second column containing the located colorant-dependent vector (in the Figure $v_1$, $v_2$ etc. represent different vector values). The print engine 110 of FIG. 1 may thus look-up a colorant-dependent vector for a given spot color by reading the entry in the second column for a given row.

Figure 3:
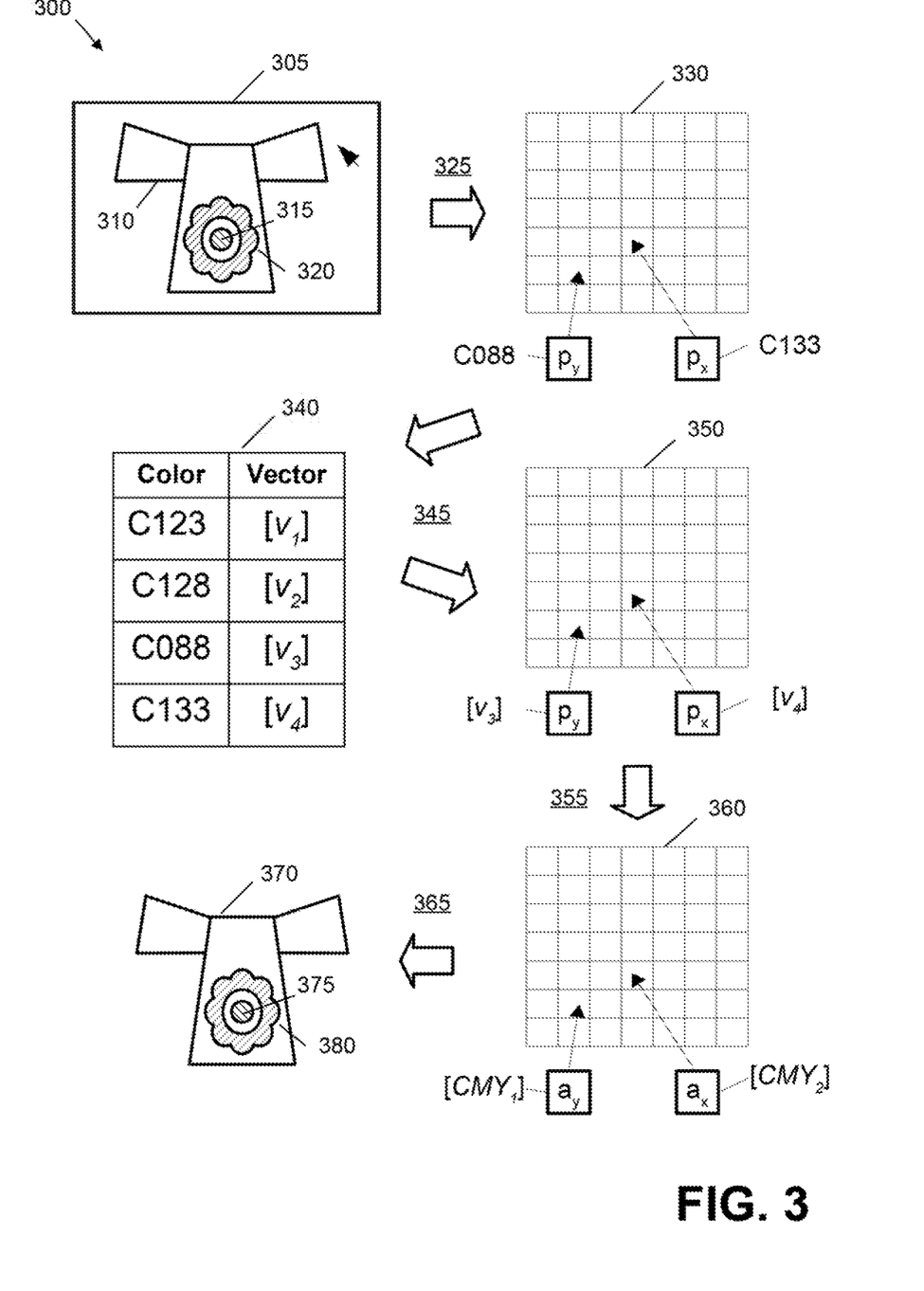
FIG. 3 is a schematic illustration depicting various example stages in the generation of a printed output.

FIG. 3 shows an example 300 of a process flow that may be applied when using the printing system 100 of FIG. 1. An example of textile printing is provided. Printing may be applied to other substrates, including paper, plastic, and corrugated media in other examples. It should be noted that example 300 is just one implementation of a process flow out of many different possibilities.

To begin, a designer uses a user interface 305 to create a digital representation 310 of a garment. The digital representation 310 in FIG. 3 has a pattern with two spot colors: 315 and 320. The designer, for example, may generate vector graphics to form the pattern and indicate that internal areas are to be assigned two predefined spot colors. Following the design stage, the designer sends the digital representation 310 to be printed. This is indicated by arrow 325. This generates an input image 330 that forms part of a print job, e.g. may form part of print job 120 in FIG. 1. The input image 330 has a first resolution, i.e. a set number of pixels in the x and y directions. In this example, each pixel is assigned a reference to the spot colors used by the designer. Two pixels are shown in FIG. 3, a pixel X that has a value of "C133" representing the spot color 315 and a pixel Y that has a value of "C088" representing the spot color 320. The input image 330 may be generated by a design application that provides the user interface 305 and/or a print driver of a computing device. Although the input image 330 is shown as being in a rasterized form (i.e. a data structure with rows and columns of pixel values), the printing process in certain examples may also include converting a vector image into a raster image, e.g. using a raster image processor.

Stage 345 represents the application of the print engine 110 from FIG. 1. A spot color profile 340, which in this case comprises the look-up table 280 shown in FIG. 2, is used to map the spot colors used in the input image 330 to corresponding colorant dependent vectors. In this case, pixel $p_x$ has a value of "C133", which is mapped to vector value $v_4$; and pixel $p_y$ has a value of "C088", which is mapped to vector value $v_3$. If the printing system being used comprises a CMY printer, then vectors $v_3$ and $v_4$ may comprise NPac vectors, e.g. with values of [0, 0.1, 0, 0.4, 0, 0, 0.5, 0] and [0.2, 0.6, 0, 0.2, 0, 0, 0, 0] (representing proportions of [W, C, M, Y, CM, CY, MY, CMY]). The result of stage 345 is a print-resolution rasterized image 350, where pixels have values representing colorant-dependent vectors.

Stage 355 represents halftoning of the print-resolution rasterized image 350. The output of this process is print data 360, which is a data structure representing discrete deposit instructions for addressable areas of printed output. In this case, pixel X from the print-resolution rasterized image 350 is halftoned to generate value $CMY_1$ for print-resolution area $a_X$ and pixel Y from the print-resolution rasterized image 350 is halftoned to generate value $CMY_2$ for print-resolution area $a_Y$. For a binary (two-state) printing device, the colorant deposit instructions may comprise vectors of three binary variables, e.g. [0, 1, 0] for M or [0, 1, 1] for MY (i.e. magenta/yellow overprint).

Stage 365 represents the printing of garment using the print data 360 to generate a printed output 370. The printed output comprises two colored areas 375, 380 corresponding to the two assigned spot colors 315 and 320 in the digital representation.

Figure 4:
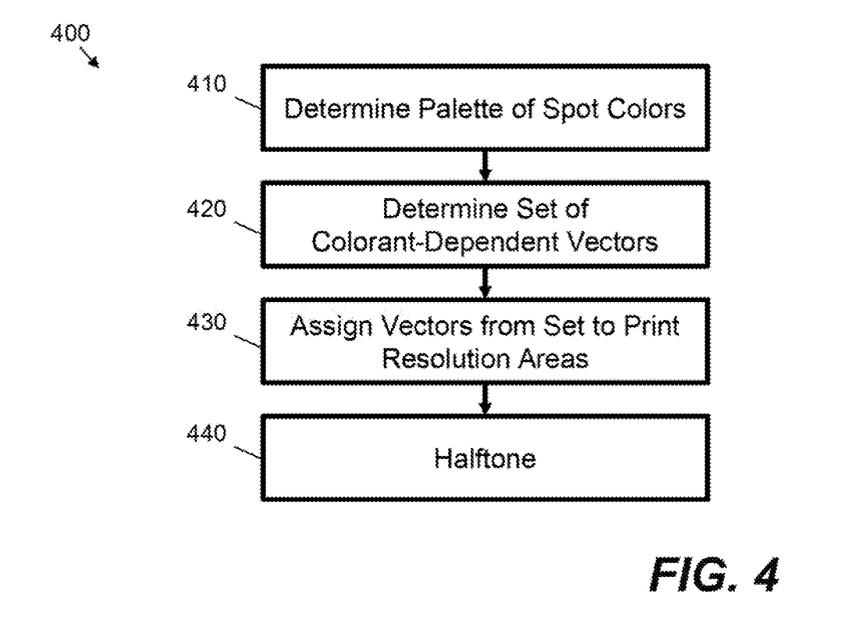
FIG. 4 is a flow chart showing a method of generating print data according to an example.

FIG. 4 shows an example method 400 of generating print data. This method may be performed by the print engine 110 or another processing device, such as a printing device in a printing system. At block 410, a palette of spot colors indicated in a print job is determined. The print job is to be printed on a printing system having a plurality of available colorants (e.g. such as a CMY or CMYK printing device as per previous examples). This may comprise determining a unique set of spot colors that are referenced in input image data, or processing color data that is included in the print job. At block 420, a set of vectors in a colorant-dependent color space is determined that corresponds to the palette of spot colors identified at block 410. This is performed using a spot color profile for the printing system. The spot color profile may comprise the spot color profile 170 or 220 as described previously. The spot color profile indicates a correspondence between spot color definitions and vectors in the colorant-dependent color space. This correspondence may be provided using a suitable data structure, such as a table or dictionary. The correspondence is based on a comparison of target spectral characteristics for the palette of spot colors and measured spectral characteristics of the printing system. For example, the spot color profile may be generated using a method similar to that applied by the components of FIG. 2. At block 430, vectors from the set of vectors are assigned to corresponding spot colors defined for print-resolution areas of the print job. For example, an input image from the print job may be parsed pixel by pixel, wherein a reference to each spot color is replaced by its mapped vector approximation. At block 440, the assigned vectors are halftoned to generate deposit instructions for the available colorants for the print-resolution areas.

The example method 400 may thus result in the example process 300 shown in FIG. 3. As with previously described examples, vectors in the colorant-dependent color space may comprise area coverage vectors, where each element represents a proportional area coverage of a colorant deposit state, a set of colorant deposit states representing available print states of the printing system. In one example, vectors in the colorant-dependent color space comprise NPac vectors.

Figure 5:
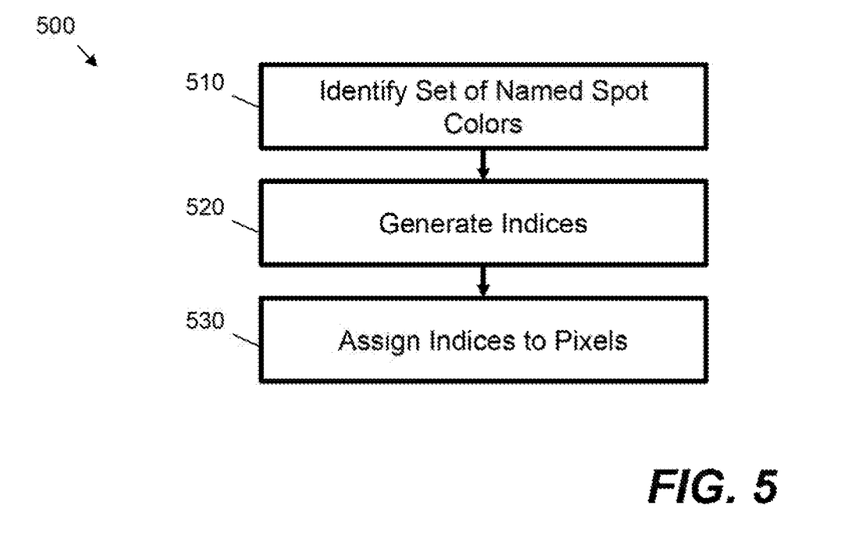
FIG. 5 is a flow chart showing a method of processing a print job according to an example.

FIG. 5 shows an example set of operations 500 that may be used to implement at least a part of blocks 410 and 430 in FIG. 4 in certain cases. Block 510 involves identifying a set of named spot colors that are associated with pixels in an input image for the print job. This may form part of block 410 from FIG. 4. This may comprise generating, or obtaining from the print data, a list of string labels or codes that identify the named spot colors. At block 520, a set of indices corresponding to the set of named spot colors are generated. For example, if there are three named spot colors: ["C123", "C088", "C133"] then these may be assigned the indices: [0, 1, 2] such that 0=C123, 1=C088 and 2=C133. Following this, at block 530, these indices may be assigned to pixels from the input image based on the associated named spot colors. For example, for a 3×3 image with three lines of color: [[C088, C088, C088], [C133, C133, C133], [C123, C123, C123]] may be processed to form a 3×3 image with the data: [[1, 1, 1], [2, 2, 2], [0, 0, 0]]. In this case, the indices are mapped to the set of vectors based on the corresponding named spot colors. Vectors are then assigned from the set of vectors to corresponding spot colors comprises by retrieving vectors based on the assigned indices for the pixels. The retrieved vectors are used as an input for halftoning. For example, a spot color profile may comprise a look-up table with the indices in a first column and mapped vectors in a second column (e.g. as generated by swapping the codes in look-up table 280 in FIG. 2 with mapped indices).

The method of FIG. 5, where an index may be assigned to each palette color in a print job, may be performed as part of print processing, and may comprise associating a spot color profile with the print job. This then provides a way to interpret color indices in terms of colorant-dependent vectors. In the printing pipeline, a rendered print job may thus be represented in an indexed color space, where an index is associated with each print-resolution pixel. Halftoning may then be performed directly since each pixel's index directly identifies a colorant-dependent vector that is to be halftoned. An output may then be generated in the form of a halftone (e.g. a separation) for each colorant used by the printing system.

In one case, the method 400 may comprise, before determining a palette of spot colors, receiving a spot color profile and storing this for use by the printing system, wherein the set of vectors are determined in the colorant-dependent space using the spot color profile without processing spectral data for the palette of spot colors. For example, the spot color profile may be supplied with a printer and/or downloaded, where the spot color profile represents "factory" spectral characteristics of the printing system.

In another case, the spot color profile. e.g. the mapping between spot colors and colorant-dependent vectors, may be generated for a specific printing system, e.g. to incorporate specific implementation factors that influence the spectral response and/or that differ from "factory" conditions. This may comprise a method similar to that set out in the example of FIG. 6.

Figure 6:
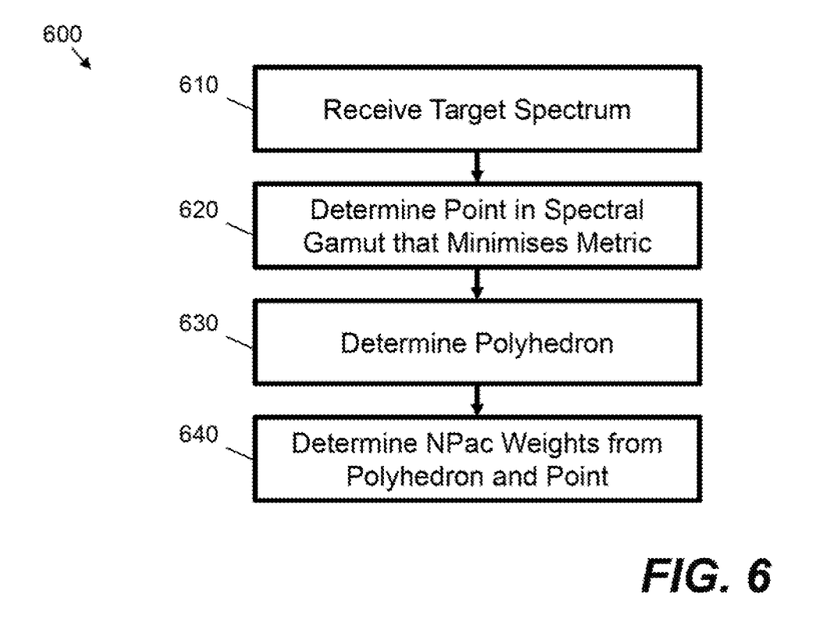
FIG. 6 is a flow chart showing a method of mapping a target spectrum to a color-dependent vector according to an example.

FIG. 6 shows a method 600 of generating a mapping between defined spot colors and colorant-dependent vectors. At block 610, target reflectance spectra are received for a set of spot colors. This set of spot colors may comprise a set of spot colors that it is desirable to print with a printing system. A palette of spot colors defined in a print job would thus comprise a subset of this set. A target reflectance spectrum may be defined as part of a Color Exchange Format (CxF) file or the like. A target reflectance spectrum may comprise an array of data points representing different wavelength samples.

The remaining blocks of the method 600 generate the mapping based on the received target reflectance spectra. The remaining blocks may be repeated for each spot color in the set of spot colors. At block 620, for a given spot color in the set of spot colors, a point in spectral space is selected that minimizes a difference function or metric between a target reflectance spectrum for the given spot color and the point, wherein the point resides within a spectral gamut for the printing system, the spectral gamut representing colors that are printable with the printing system and being generated based on spectra measured from test patches printed by the printing system using the plurality of available colorants. The difference function or metric may be said to be spectral as spectra are used as inputs to the function or metric. At block 630, a polyhedron within the spectral gamut is determined that encloses the point. Vertices of the polyhedron represent a set of vector elements, e.g. NPs that are printable by the printing system. At block 640, the location of the point is determined as a function of the locations of the vertices of the polyhedron to compute values for elements of the colorant-dependent vector.

Figure 7:
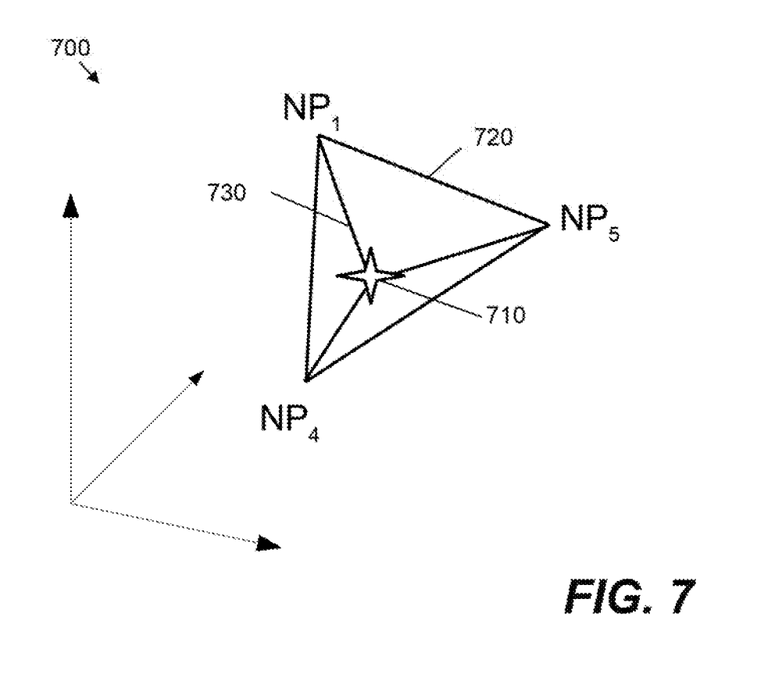
FIG. 7 is a schematic illustration of an example polyhedron as computed using the method of FIG. 6.

FIG. 7 shows an example 700 that illustrates block 630 and 640 in FIG. 6. The example 700 of FIG. 7 is provided in a three-dimensional space, however, an actual space will have more dimensions. In FIG. 7, a point 710 is shown that represents a location within the space (e.g. a spectral co-ordinate). A polyhedron 720 is shown with three vertices, representing in this case different NPs ($NP_1$, $NP_4$ and $NP_5$). Area coverage values for the NPs represented by the vertices may then be computed using the distances 730 from the vertices to the point 710. For example, the distances may be used to compute proportions for NPs 1, 4 and 5, wherein proportions of other NPs are set to 0. The area coverage values for the set of NPs are used to output values for elements of a NPac vector.

Block 640 may comprise computing barycentric co-ordinates of a chosen reflectance within a tessellation of the spectral gamut. In this case, the relative magnitude of the barycentric co-ordinates correspond to the volume ratios of an NP within the polyhedron. Thus, for a printable reflectance within any polyhedron, the area coverage for an NP can be determined by directly mapping from the barycentric co-ordinates which correspond to the NPac vectors. Therefore, a print mapping to NPac vectors from a spectral point is achieved using tessellation where the resulting NPac vectors correspond to the selected reflectance spectrum, the reflectance spectrum being selected to minimize a difference in visual appearance with reference to a target reflectance spectrum for the spot color.

By using NPac vectors as the colorant-dependent vectors, a greater variety of selectable points is achieved within the spectral gamut. They also allow for a more predictable relationship between a given spectrum and a given NPac vector and better accuracy. For example, there may be a set of NPac vectors that have a spectral correspondence with a given spot color. These may be deemed "metamers" for the spot color, e.g. they may all have a spectral difference or appearance metric difference within a given tolerance range. In this case, a metamer within the set of NPac vectors may be selected based on at least one color property indicated in the spot color definition for the given spot color. For example, the spot color definition may indicate a particular level of graininess or a certain illuminant invariance. The metamer that best provides these properties from the set (e.g. with reference to a numeric output of a given match function) may then be selected. As another example, a set of metamers may have a common spectral difference, and/or be within a predetermined difference tolerance band, but may have different wavelength profiles (e.g. a peak may occur at slightly different locations for each metamer). A particular metamer may then be selected based on a best match within a particular wavelength range, or based on another corresponding appearance metric.

In one case, an output of a distance function may be compared to a threshold before determining whether to accept a given spot color—colorant-dependent vector pairing. If the difference is greater than the threshold value, a warning may be provided or it may be indicated that a spectral match is not possible. In this case, it may be possible to adjust the operating parameters for the printing system to provide a better spectral match (e.g. a subsequent difference below the threshold). In one case, pairing may be inspected by an operator (e.g. based on visual renderings or difference values) and confirmed.

Once repeated for each spot color in the set of spot colors the method of FIG. 6 may generate a list of spot color—colorant-dependent vector pairs. These may be used as a spot color profile. The method of FIG. 6 may be performed as part of a configuration procedure, e.g. when setting up a printing system, or on a per print job basis. In the latter case, different operating parameters of the printing system may affect the shape of the spectral gamut and this may be modeled by adjusting the gamut. The method of FIG. 6 may be used to implement the profile generator 210 of FIG. 2.

In one case, assigning vectors to corresponding spot colors may comprise obtaining a look-up table comprising nodes corresponding to the palette of spot colors, the nodes having mapped output values corresponding to the set of vectors. For example, to apply the examples in a HANS printing system, a look-up table may be provided where nodes that correspond to spot colors in the print job have an output NPac vector that corresponds to the mapped colorant-dependent vector. Other nodes may be deleted, mapped to null outputs, or kept based on an initial color mapping. This can allow an approximation to spectral printing with existing color printing pipelines without interpolation. In this case, an image may be treated as a grayscale image, where pixel values indicate an index that is mapped by the look-up table. In these cases, the look-up table may be applied to an input image for the print job to output a print-resolution intermediate image, the input image having pixel data with values corresponding to one of the palette of spot colors, the print-resolution intermediate image having print-resolution pixel data with values corresponding to the mapped vectors, the print-resolution intermediate image being used as input for the halftoning.

In certain cases, the examples described herein may further comprise printing the processed print job using the output colorant deposit instructions, e.g. on a suitable printing device.

Figure 8:
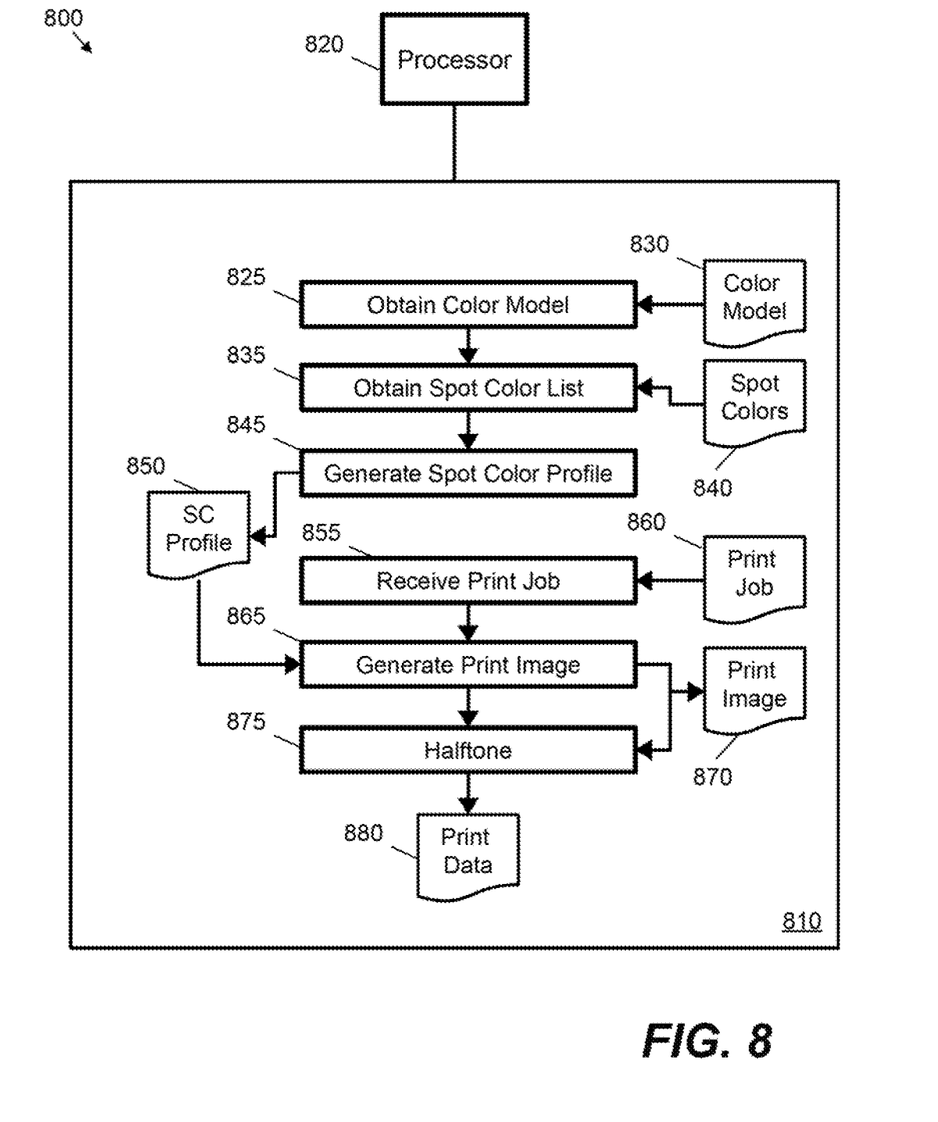
FIG. 8 is a schematic illustration of a non-transitory computer-readable storage medium according to an example.

FIG. 8 shows an example 800 of a non-transitory computer-readable storage medium 810 that stores instructions for execution by a processor 820. Via instructions 825, the processor 820 obtains a color model 830 that maps between data in a spectral color space and data in a colorant-dependent color space based on measured spectral characteristics of a printing system. The color model 830 may comprise a spectral gamut, such as the spectral gamut 250 in FIG. 2. The color model 830 may be generated via measurement of printed test patches. Via instructions 835, the processor 820 obtains a list of named spot colors to be printed on the printing system 840 and a set of corresponding target spectral characteristics. Via instructions 845, the processor is instructed to generate a spot color profile 850 using the color model 830. Instructions 845 include instructions to cause the processor to select vectors in the colorant-dependent space for the list of named spot colors 840 based on a comparison of mapped values in the spectral color space and the target spectral characteristics for the named spot colors. For example, these instructions may implement the profile generator 210 of FIG. 2 or the method 600 of FIG. 6. Instructions 825, 835 and 845 may form part of a configuration procedure that is performed prior to a set of print jobs, or when setting up a printing system.

Instructions 855, 865 and 875 are performed at print time. Via instructions 855, the processor 820 receives a print job 860 to be printed using the printing system. Via instructions 865, the processor 820 generates a rasterized print image 870 for the print job using the spot color profile 850, wherein print-resolution pixels are assigned values indicative of vectors in the colorant-dependent space based on named spot colors assigned to corresponding pixels in an input image for in the print job. Via instructions 875, the processor 820 applies a halftoning function to the rasterized print image 870 to generate print data 880. The print data 880 is usable to generate deposit instructions for colorants of the printing system. In this case, vectors in the colorant-dependent space are used as an input for the halftoning function and the deposit instructions are used to print the print job 860 on the printing system.

In one case, the instructions cause the processor to generate an index for each named spot color in the print job 860 and associate the indices to corresponding vectors in the colorant-dependent space using the spot color profile 850. In this case, the indices may be assigned to pixels in the input image based on received color data for the input image to generate the rasterized print image 870. In this case, the rasterized print image may be halftoned based on the vectors indicated by the assigned indices.

At least some aspects of the examples described herein with reference to the drawings may be implemented using computer processes operating in processing systems or processors, e.g. as described with reference to FIG. 8. These aspects may also be extended to computer programs, particularly computer programs on or in a carrier, adapted for putting the aspects into practice. The program may be in the form of non-transitory source code, object code, a code intermediate source and object code such as in partially compiled form, or in any other non-transitory form suitable for use in the implementation of processes described herein. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

Similarly, it will be understood that a controller may in practice be provided by a single chip or integrated circuit or plural chips or integrated circuits, optionally provided as a chipset, an application-specific integrated circuit (ASIC), field-programmable gate array (FPGA), etc. For example, this may apply to all or part of a controller or other printer control circuitry. The chip or chips may comprise circuitry (as well as possibly firmware) for embodying at least the print engine, profile generator or processors as described above, which are configurable so as to operate in accordance with the described examples. In this regard, the described examples may be implemented at least in part by computer software stored in (non-transitory) memory and executable by the processor, or by hardware, or by a combination of tangibly stored software and hardware (and tangibly stored firmware).

Certain examples described herein reduce and/or remove constraints that apply to general spectral printing workflows when printing a palette of spot colors, e.g. as is the case for printing on textile media for sportswear and fashion garments. Described examples employ spot color workflow mechanisms that are put in correspondence with low-level printing pipeline inputs. This provides a better color match that comparative printing pipelines while avoiding an overhaul of those pipelines to accommodate full spectral printing. Moreover, the present examples provide a resource efficient implementation. For example, even if principal component analysis is applied to reduce spectral content to variable values for 6-9 basis functions, a comparative spectral printing pipelines uses 6-9 channels at 6-8 bits per channel for each pixel of input image. In comparison, certain examples with named spot colors, e.g. with indices as set out above, use only one channel of 4-6 bits per pixel (i.e. to encode the spot color index).

The preceding description has been presented only to illustrate and describe examples of the principles described. This description is not intended to be exhaustive or to limit these principles to any precise form disclosed. Features of individual examples may be combined in different configurations, including those not explicitly set out herein. Many modifications and variations are possible in light of the above teaching.

What is claimed is:

1. A method comprising:
    determining a palette of spot colors indicated in a print job, the print job to be printed on a printing system having a plurality of available colorants;
    determining a set of vectors in a colorant-dependent color space that correspond to the palette of spot colors using a spot color profile for the printing system, the spot color profile indicating a correspondence between spot color definitions and vectors in the colorant-dependent color space, the correspondence being based on a comparison of target spectral characteristics for the palette of spot colors and measured spectral characteristics of the printing system;
    assigning vectors from the set of vectors to corresponding spot colors defined for print-resolution areas of the print job; and
    halftoning the assigned vectors to generate deposit instructions for the available colorants for the print-resolution areas.

2. The method of claim 1, wherein vectors in the colorant-dependent color space comprise area coverage vectors, each element in an area coverage vector representing a proportional area coverage of one of a set of colorant deposit states for the plurality of available colorants, the set of colorant deposit states representing available print states of the printing system.

3. The method of claim 2, wherein vectors in the colorant-dependent color space comprise Neugebauer Primary Area Coverage (NPac) vectors.

4. The method of claim 1, wherein determining a palette of spot colors comprises:
    identifying a set of named spot colors that are associated with pixels in an input image for the print job;
    generating a set of indices corresponding to the set of named spot colors; and
    assigning indices to pixels from the input image based on the associated named spot colors,
    wherein the indices are mapped to the set of vectors based on the corresponding named spot colors and assigning vectors from the set of vectors to corresponding spot colors comprises:
    retrieving vectors based on the assigned indices for the pixels, the retrieved vectors being used as an input for halftoning.

5. The method of claim 1, comprising, before determining a palette of spot colors:
    receiving the spot color profile and storing for use by the printing system,
    wherein the set of vectors are determined in the colorant-dependent space using the spot color profile without processing spectral data for the palette of spot colors.

6. The method of claim 1, comprising:
    receiving target reflectance spectra for a set of spot colors that includes the palette of spot colors, and generating the spot color profile based on the target reflectance spectra, wherein generating the spot color profile comprises, for a given spot color in the set of spot colors:

selecting a vector for the given spot color that minimizes a spectral difference between a target reflectance spectrum for the given spot color and a reflectance spectrum for the vector that resides within a spectral gamut for the printing system, the spectral gamut representing colors that are printable with the printing system, the spectral gamut being generated based on spectra measured from test patches printed by the printing system using the plurality of available colorants.

7. The method of claim 6, wherein selecting a vector comprises:

determining a point within the spectral gamut in spectral color space that minimizes a distance metric computed using the target reflectance spectrum;

determining a polyhedron within the spectral gamut that encloses the point, wherein vertices of the polyhedron represent a set of Neugebauer Primaries printable by the printing system; and determining the location of the point as a function of the locations of the vertices of the polyhedron to compute area coverage values for the set of Neugebauer Primaries, the area coverage values for the set of Neugebauer Primaries being used to output values for elements of a Neugebauer Primary Area Coverage (NPac) vector.

8. The method of claim 3, comprising:

retrieving spot color definitions for a set of named spot colors that includes the palette of spot colors, and generating the spot color profile based on the retrieved spot color definitions, wherein generating the spot color profile comprises, for a given spot color in the set of spot colors:

determining a set of Neugebauer Primary Area Coverage (NPac) vectors that have a spectral correspondence with the given spot color; and selecting a metamer within the set of Neugebauer Primary Area Coverage (NPac) vectors based on at least one color property indicated in the spot color definition for the given spot color.

9. The method of claim 1, wherein assigning vectors to corresponding spot colors comprises:

obtaining a look-up table comprising nodes corresponding to the palette of spot colors, the nodes having mapped output values corresponding to the set of vectors; and applying the look-up table to an input image for the print job to output a print-resolution intermediate image, the input image having pixel data with values corresponding to one of the palette of spot colors, the print-resolution intermediate image having print-resolution pixel data with values corresponding to the mapped vectors, the print-resolution intermediate image being used as input for the halftoning.

10. A printing system comprising:

a print engine to receive a print job and to apply halftoning to generate colorant deposit instructions; and a spot color profile indicating a correspondence between spot color definitions and vectors in a colorant-dependent color space, the correspondence being based on a comparison of target spectral characteristics for a plurality of spot colors and measured spectral characteristics of the printing system;

wherein the print engine comprises:

a palette processing engine to identify a palette of spot colors for the print job and to determine a set of vectors in the colorant-dependent color space that match the palette of spot colors based on the spot color profile; and a color assignment engine to parse the print job and assign vectors from the set of vectors to print-resolution areas based on defined spot colors for the print-resolution areas, wherein the print engine is to apply halftoning to an output of the color assignment engine.

11. The printing system of claim 10, comprising:

a profile generator to generate the spot color profile based on target reflectance spectra for a set of spot colors, the profile generator being arranged to instruct printing of test patches for selected vectors in colorant-dependent color space using the printing system and to receive data indicative of measured spectra for the test patches, wherein the profile generator is to compute a spectral gamut based on the received data, the spectral gamut being useable to map between the colorant-dependent color space and spectral color space.

12. The printing system of claim 10, wherein the print engine is configured to generate colorant deposit instructions for printing on a textile media.

13. The printing system of claim 10, wherein the print engine comprises:

a print job interface to receive a print job, the print job comprising image data comprising a plurality of pixels and color data indicating named spot colors assigned to each of the plurality of pixels, wherein the print engine maps between the named spot colors and vectors from the set of vectors without processing spectral data.

14. A non-transitory computer-readable storage medium storing instructions that, when executed by a processor, cause the processor to:

obtain a color model that maps between data in a spectral color space and data in a colorant-dependent color space based on measured spectral characteristics of a printing system;

obtain a list of named spot colors to be printed on the printing system and a set of corresponding target spectral characteristics;

generate a spot color profile using the color model, including instructions to cause the processor to select vectors in the colorant-dependent space for the list of named spot colors based on a comparison of mapped values in the spectral color space and the target spectral characteristics for the named spot colors;

receive a print job to be printed using the printing system;

generate a rasterized print image for the print job using the spot color profile, wherein print-resolution pixels are assigned values indicative of vectors in the colorant-dependent space based on named spot colors assigned to corresponding pixels in an input image for in the print job; and apply a halftoning function to the rasterized print image to generate deposit instructions for colorants of the printing system, wherein vectors in the colorant-dependent space are used as an input for the halftoning function and the deposit instructions are used to print the print job on the printing system.

15. The medium of claim 14, wherein the instructions cause the processor to:

generate an index for each named spot color in the print job;
associate the indices to corresponding vectors in the colorant-dependent space using the spot color profile; and
assign the indices to pixels in the input image based on received color data for the input image to generate the rasterized print image,
wherein the instructions to apply a halftoning function comprise instructions that cause the processor to:
halftone the rasterized print image based on the vectors indicated by the assigned indices.

* * * * *